(12) United States Patent
Freydank et al.

(10) Patent No.: US 7,964,806 B2
(45) Date of Patent: *Jun. 21, 2011

(54) ELECTRONIC SCALE COMPRISING A BUBBLE LEVEL

(75) Inventors: Gerd Freydank, Goettingen (DE);
Winfried Graf, Niemetal (DE);
Christian Oldendorf, Goettingen (DE)

(73) Assignee: Sartorius AG, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/483,511

(22) Filed: Jun. 12, 2009

(65) Prior Publication Data

US 2009/0301790 A1    Dec. 10, 2009

Related U.S. Application Data

(63) Continuation of application No. PCT/EP2007/009585, filed on Nov. 6, 2007.

(30) Foreign Application Priority Data

Dec. 15, 2006  (DE) .......................... 10 2006 059 260

(51) Int. Cl.
*G01C 9/06* (2006.01)
*G01G 23/01* (2006.01)

(52) U.S. Cl. .................. 177/25.13; 177/185; 33/366.14; 33/366.16; 73/649; 73/655; 702/101

(58) Field of Classification Search ............... 33/366.14, 33/366.16; 73/649, 655; 702/101, 102; 177/25.13, 177/25.14, 185, 210 EM, 212
See application file for complete search history.

(56) References Cited

U.S. PATENT DOCUMENTS

| | | | |
|---|---|---|---|
| 3,322,222 A | | 5/1967 | Baur |
| 4,154,000 A | * | 5/1979 | Kramer ....................... 33/366.14 |
| 4,212,361 A | * | 7/1980 | Stocker ......................... 177/200 |
| 4,494,620 A | | 1/1985 | Knothe et al. |
| 4,751,973 A | * | 6/1988 | Freeman et al. .............. 177/200 |

(Continued)

FOREIGN PATENT DOCUMENTS
DE    32 34 372 A1    3/1984
(Continued)

OTHER PUBLICATIONS

A. Pfeiffer, et al., "Hochpraezises Inklinometer mit optoelektronischer Neigungserfassung.", (High precision inclinometer based on an optoelectronic position measurement principle) Technisches Messen 58 (1991), pp. 101-105.

*Primary Examiner* — Randy W Gibson
(74) *Attorney, Agent, or Firm* — Sughrue Mion, PLLC

(57) ABSTRACT

An electronic scale having a measuring sensor (1 ... 16), a digital signal processing unit (18), a digital display (19), a bubble level (20), which includes a container (21) that is partially filled with a liquid (22) while forming a gas bubble (23), and circuit component or program routine in the digital signal processing unit (18) for detecting a displacement of the gas bubble (23). An additional circuit component or program routine detects the diameter of the gas bubble (23). The diameter of the gas bubble changes due to vertical vibrations of the scale. The signal from the measuring sensor (1 ... 16) falsified by vibrations can thus be corrected by the digital signal processing unit (18) by calculation, making use of the diameter signal.

14 Claims, 4 Drawing Sheets

U.S. PATENT DOCUMENTS

| | | | |
|---|---|---|---|
| 5,062,492 A * | 11/1991 | Inoue | 177/25.14 |
| 6,794,586 B1 * | 9/2004 | Mason | 177/25.15 |
| 7,325,321 B2 | 2/2008 | Kuenzi et al. | |
| 7,497,021 B2 * | 3/2009 | Perchak et al. | 33/366.16 |
| 7,526,870 B2 * | 5/2009 | Klapper et al. | 33/366.23 |
| 2005/0126024 A1 | 6/2005 | Kunzi et al. | |
| 2007/0169362 A1 * | 7/2007 | Perchak et al. | 33/366.16 |
| 2008/0235966 A1 * | 10/2008 | Klapper et al. | 33/366.23 |
| 2009/0242279 A1 * | 10/2009 | Freydank et al. | 177/25.13 |
| 2009/0293297 A1 * | 12/2009 | Roemhild et al. | 33/366.16 |

FOREIGN PATENT DOCUMENTS

| | | | |
|---|---|---|---|
| EP | 1 541 978 A | | 6/2005 |
| GB | 2080540 A | * | 6/1981 |
| JP | 63-078023 | * | 4/1988 |
| JP | 63-241317 | * | 10/1988 |

* cited by examiner

ELECTRONIC SCALE COMPRISING A BUBBLE LEVEL

This is a Continuation of International Application PCT/EP2007/009585, with an international filing date of Nov. 6, 2007, which was published under PCT Article 21(2) in German, and the complete disclosure of which, including amendments, is incorporated into this application by reference.

FIELD AND BACKGROUND OF THE INVENTION

The invention relates to an electronic scale comprising a measuring sensor, a digital signal processing unit, a digital display and a bubble level, said bubble level comprising a container that is partially filled with a liquid while forming a gas bubble, and a circuit component or program routine in the digital signal processing unit for detecting a displacement of the gas bubble.

Scales of this type are generally known and are described, for example, in DE 32 34 372 C2 (which corresponds to U.S. Pat. No. 4,494,620). The electrical signal from the bubble level is used, employing digital means, to correct the error in the scale caused by the cosine effect when it is tilted. This means that the scale no longer has to be placed in an exactly horizontal orientation through the use of adjusting feet.

However, these scales have not become established in practice, since the cost of the bubble level has been considered too great in relation to the benefit therefrom.

OBJECTS AND SUMMARY OF THE INVENTION

An object of the invention is therefore to develop a scale of the aforementioned type such that the bubble level brings an additional benefit for the signal processing of the scale.

This is achieved according to one formulation of the invention in that an additional circuit component or program routine is provided for detecting the diameter of the gas bubble.

The gas bubble of a bubble level not only changes its position when tilted, it also changes its diameter as a function of the gravitational acceleration acting upon it. Where the gravitational acceleration is high, the gas bubble becomes thin and has a larger diameter, whereas where the gravitational acceleration is low, the gas bubble becomes more spherical due to the surface tension and its diameter becomes smaller. If the gravitational acceleration changes—in the event, for example, of vertical vibrations—the diameter of the gas bubble changes synchronously therewith. From the change in the diameter signal, conclusions can be drawn concerning the size and phase position of the vibrations. As a result, from the signal for the displacement, the digital signal processing unit can carry out the known correction of the tilting influences on the weighing result, while simultaneously performing a correction of the vibration influences based on the diameter signal.

If the position of the gas bubble is sensed, for example optically by means of two light-sensitive elements—for example, photodiodes—at the edge of the gas bubble, the difference of signals from the two light-sensitive elements results in the displacement. Advantageously, the diameter of the gas bubble is then determined from the sum of the signals from the two light-sensitive elements. This means that special scanning sensors are not required for determining the diameter and another evaluation of the signals from the existing sensors is sufficient. The same applies if the position of the gas bubble is electrically sensed.

BRIEF DESCRIPTION OF THE DRAWINGS

Further features and advantages will now be described with reference to the schematic drawings, in which.

DETAILED DESCRIPTION OF THE PREFERRED EMBODIMENTS

Figure 1:
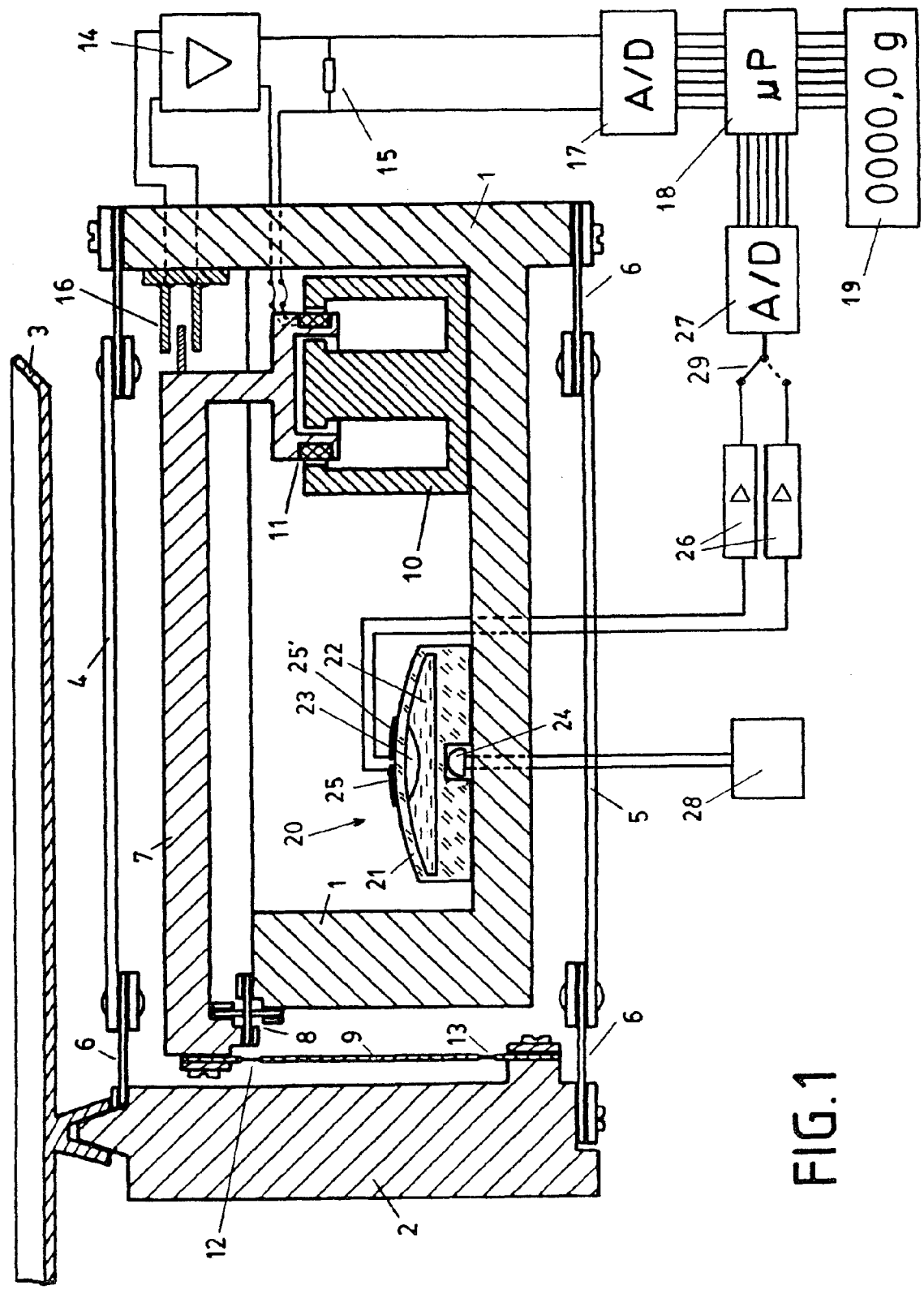
FIG. 1 is a sectional representation of the primary parts of a scale with a bubble level and provided with optical positional detection.

The electronic scale of FIG. 1 includes a support member 1 fastened to a housing. A load carrier 2 is connected via two rods 4 and 5 to the articulation points 6 such that the load carrier 2 is movable in the vertical direction. The load carrier carries, in its upper part, a load pan 3 for receiving the goods being weighed and transfers the force corresponding to the mass of the goods being weighed via a coupling element 9, which has narrowed sites 12 and 13, to the shorter lever arm of a transmission lever 7. The transmission lever 7 is mounted on the support member 1 by means of a flexural pivot 8. The compensation force, which is generated by a coil 11 through which a current flows and which is arranged in the air gap of a permanent magnet system 10, engages on the longer lever arm of the transmission lever 7. The size of the compensation current is controlled in a known manner by means of a position sensor 16 and a control amplifier 14 such that a balance is struck between the weight of the goods being weighed and the electromagnetic compensation force. The compensation current generates a measurement voltage across a measuring resistor 15 and the voltage is fed to an analog/digital converter 17. The digitized result is passed to a digital signal processing unit 18 and displayed in digital form on the display 19.

Scales of this type are generally known in their design and function, for which reason they have been described only generally and concisely above.

An electric bubble level 20 is also built into the scale. The bubble level includes a transparent container 21 which is partially filled with a liquid 22, so that a gas bubble 23 is formed at the highest site of the container 21. Due to the curvature of the upper limiting surface of the container 21, the position of this gas bubble 23 depends on the tilt of the scale. In the drawings, this curvature is shown exaggerated. Arranged centrally beneath the container 21 is a light-emitting diode (LED) 24 which emits its radiation vertically upwardly through the lower container wall, the liquid 22, the gas bubble 23 and the upper container wall. The radiation which is not absorbed is then registered by two light-sensitive elements—for example, two photodiodes—25 and 25'. The liquid 22 is selected and/or colored so that it partially absorbs the radiation from the LED. The result is that the intensity of light falling on the light-sensitive elements 25 and 25' is strongly dependent on the thickness of liquid through which it passes, and therefore on the position of the gas bubble 23. The LED 24 is supplied with a constant current by a current supply unit 28. The output signal from the light-sensitive elements 25 and 25' is amplified in two amplifiers 26 and fed via a multiplexer 29 to an analog/digital converter 27 and digitized therein. The digital signal processing unit 18 can then calculate the tilt of the scale from the difference of the signals and the known characteristic curve of the bubble level, and accordingly correct the measured value of the scale system, which is supplied by the analog/digital converter 17.

Figure 2:
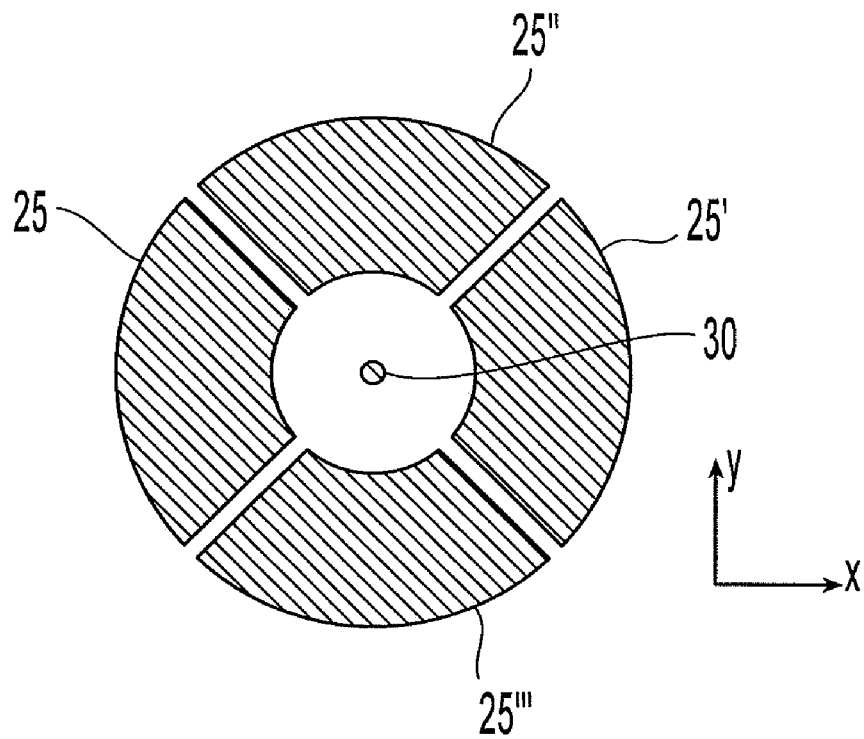
FIG. 2 shows the arrangement of the light-sensitive elements of the bubble level of FIG. 1.

For reasons of clarity, FIG. 1 shows the sensing of the tilt position in only one direction. For sensing in both directions, a round bubble level is advantageously used—commonly referred to as a box level—which, in the present embodiment, includes four light-sensitive elements 25, 25', 25" and 25''', the form and arrangement of which are shown in FIG. 2. With their difference signal, the light-sensitive elements 25 and 25' sense the tilt in the X-direction, while the light-sensitive elements 25" and 25''' sense the tilt in the Y-direction. Also connected downstream of each of the light-sensitive elements 25" and 25''' is an amplifier and the multiplexer 29 has two additional inputs (not shown).

Figure 3:
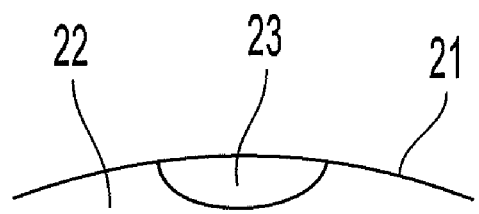
FIG. 3 shows the form of the gas bubble of the bubble level of FIG. 1 given a small gravitational acceleration.
Figure 4:
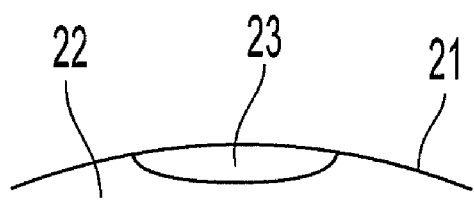
FIG. 4 shows the form of the gas bubble of the bubble level of FIG. 1 given a large gravitational acceleration.

The influence of gravitational acceleration on the form of the gas bubble is shown in FIGS. 3 and 4. When the gravitational acceleration is small, the influence of surface tension is predominant and the form of the gas bubble approaches that of a sphere, as shown in FIG. 3. At higher gravitational acceleration levels, the influence of the gravitational acceleration is greater and the gas bubble is pressed into a flatter form, as shown in FIG. 4. When the scale is subjected to vertical vibration, larger and smaller gravitational accelerations are produced alternatingly and in sync with the vibration. As a result, the diameter of the gas bubble also varies synchronously with the vibration. The digital signal processing unit 18 can calculate the diameter from the cumulative signal from the two light-sensitive elements 25 and 25' and/or from the cumulative signal from the two light-sensitive elements 25" and 25'''. A pre-condition for this is, naturally, that the multiplexer 29 and the analog/digital converter 27 are fast enough so that they correctly reproduce the size and phase position of the vibrations. Since the main vibrations lie within the frequency range of approximately 0.1 Hz to 10 Hz, this does not pose a problem. Vibrations having a higher frequency, for example over 50 Hz, can be effectively suppressed with common digital filters, so that there is no necessity for additional suppression of disturbance signals in this frequency region.

Figure 5:
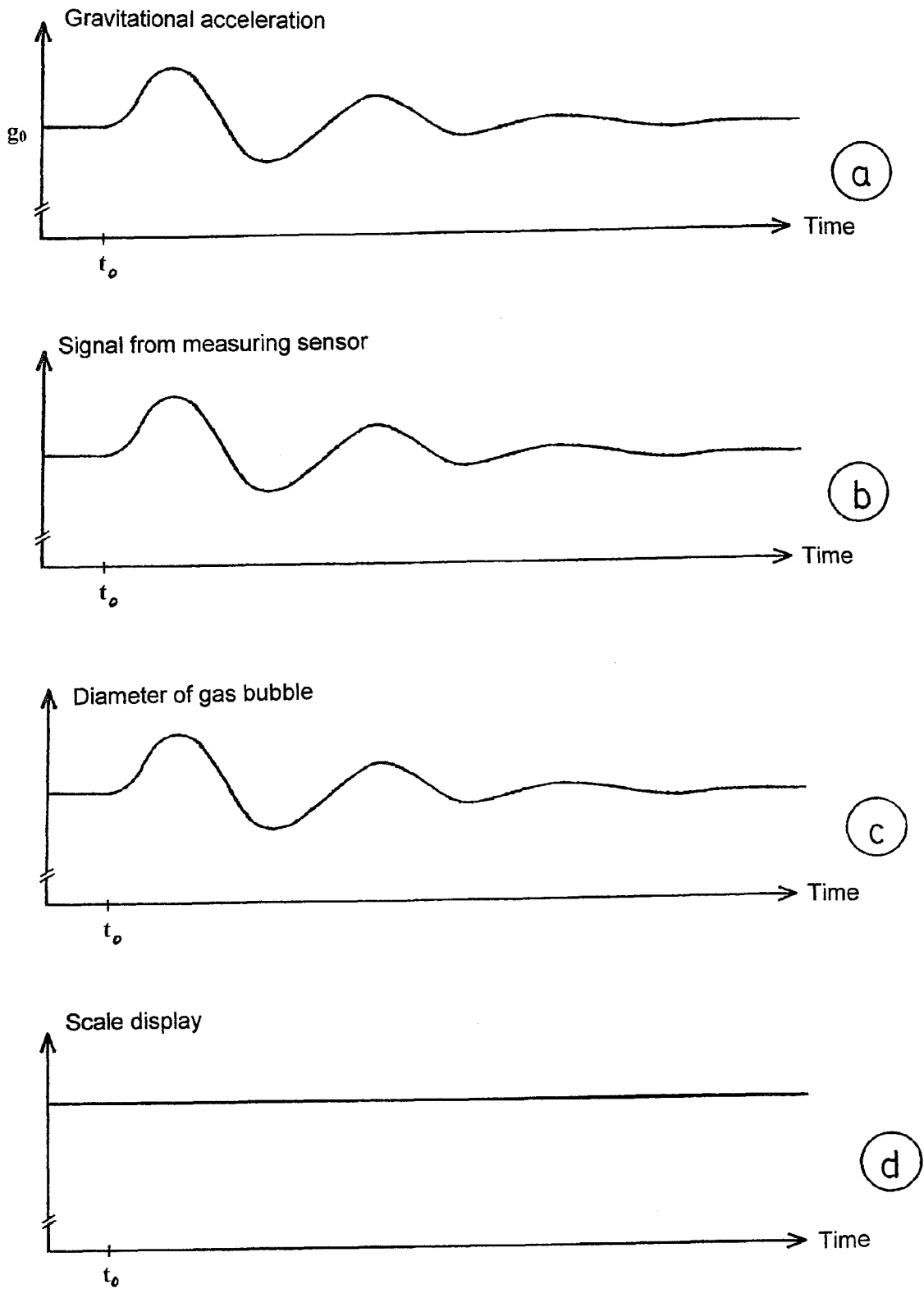
FIG. 5 is a graphical representation of the correction of disturbances.

FIG. 5 shows, by way of example, the correction of a disturbance occurring at the time point $t_0$. Graph a shows the disturbance which acts externally on the scale. Normal gravitational acceleration $g_0$ is shown overlaid, from time point to, with a disturbance acceleration, which begins with an increased gravitational acceleration and which, after a few periods, dies away relatively rapidly. This disturbance acts proportionally on the signal of the measuring sensor, as can be detected, for example, from the measuring resistor 15 and as shown in graph b. The disturbance acceleration acts in a similar manner on the diameter of the gas bubble, as shown in graph c. The digital signal processing unit 18 then corrects the signal from the measuring sensor with suitable correction algorithms, so that the disturbance in the scale display 19 has no, or only a greatly reduced, effect (graph d).

These correction algorithms can be readily designed by a person skilled in the art, taking account, for example, of the fact that with a larger weight on the load pan 3, a greater correction is necessary.

It has been assumed in the foregoing that the current diameter signal from the bubble level 20 is used directly for correction of the current signal from the measuring sensor. Naturally, this is based on the pre-condition that the frequency and phase behavior of the diameter signal agrees in the frequency range of the correction with the frequency and phase behavior of the measuring sensor. This agreement can be achieved, for example, through appropriate selection of the viscosity of the liquid 22 in the bubble level, as well as through analog or digital filtration of the diameter signal. In the same way, the signal from the measuring sensor can be filtered in a known manner before the vibration correction is carried out as described.

Alternatively, however, simpler correction strategies are also possible. For example, the digital signal processing unit 18 can easily determine the mean amplitude of the changes in the diameter signal, and thereby also the mean amplitude of the disturbance acceleration. Based on the resulting signal, at least one filter stage in the filtration of the signal from the measuring sensor can be adjusted. Where the disturbance accelerations are small, the signal from the measuring sensor is filtered only slightly, whereas for large disturbance accelerations, the filter time constant is increased and a stable display output is achieved despite the worsened recording conditions.

In another advantageous embodiment, only the frequency of the change in the diameter signal is determined. It is then ensured by, for example, altering the sampling frequency of the analog/digital converter 17, that the sampling frequency is a multiple of the disturbance frequency, in order thus to suppress this disturbance frequency particularly effectively. The same is also possible by suitable adjustment of the digital filtration in the digital signal processing unit 18. This alternative is particularly advantageous when the disturbance accelerations are not of a short-term nature—as assumed in FIG. 5—but act on the scale for a longer period. An example of this is the oscillations of a building due to poorly balanced rotating machinery.

The variants of the vibration correction described so far are all based on correction in the digital signal processing unit 18 of the signal from the measuring sensor. However, it is also possible to provide actuators, for example in the feet of the scale, such that the actuators mechanically correct any tilt and any vibrations measured by the bubble level. For a tilted position of the scale, this procedure is known and is realized, for example, with motor-powered adjusting feet. In similar manner, this can be realized for the disturbance accelerations with actuators that enable adjustment in the required frequency range. For example, piezo actuators are suitable for this purpose. These actuators are then controlled, for example, in a feedback control circuit such that the vibration signal from the bubble level is regulated to (almost) zero.

An embodiment of invention has been described above using the example of a scale with an optical transmitted-light bubble level. However, other embodiments of the bubble level are also possible. For example, the LED can be arranged on the same side of the bubble level as the light-sensitive elements 25 . . . 25'''. The light-sensitive elements then detect the reflected light, which also changes depending on the position of the gas bubble. The light-emitting diode would then, for example, be situated in the location indicated in FIG. 2 with the reference sign 30.

Instead of optical detection of the position of the gas bubble, embodiments using electrical detection are also possible. If the container 21 is provided in its interior with a central electrode and a ring-form electrode subdivided into four electrode segments—as shown in FIG. 2—when the position of the gas bubble changes, the ohmic resistance between the central electrode and the individual electrode segments also changes. For this purpose, the liquid in the bubble level must simply have a suitable specific resistance. Capacitive evaluation is also possible. In particular, based on the dielectric constant of the liquid 22, the capacitance between the electrodes changes when the position of the gas bubble changes.

In the above description, for two-dimensional sensing of the displacement of the gas bubble 23, four light-sensitive elements 25 . . . 25''' or four electrode segments have been used. This is simplest case to explain, since the displacement in the X-direction and in the Y-direction (according to FIG. 2) can be obtained directly from the difference in the signals from the opposing light-sensitive elements or electrode segments. With a slightly greater mathematical complexity, it is possible, however, to determine the displacement in the X- and Y-directions using a higher number of elements or segments, for example from three light-sensitive elements or three electrode segments arranged, for example, at the corners of an equilateral triangle.

Figure 6:
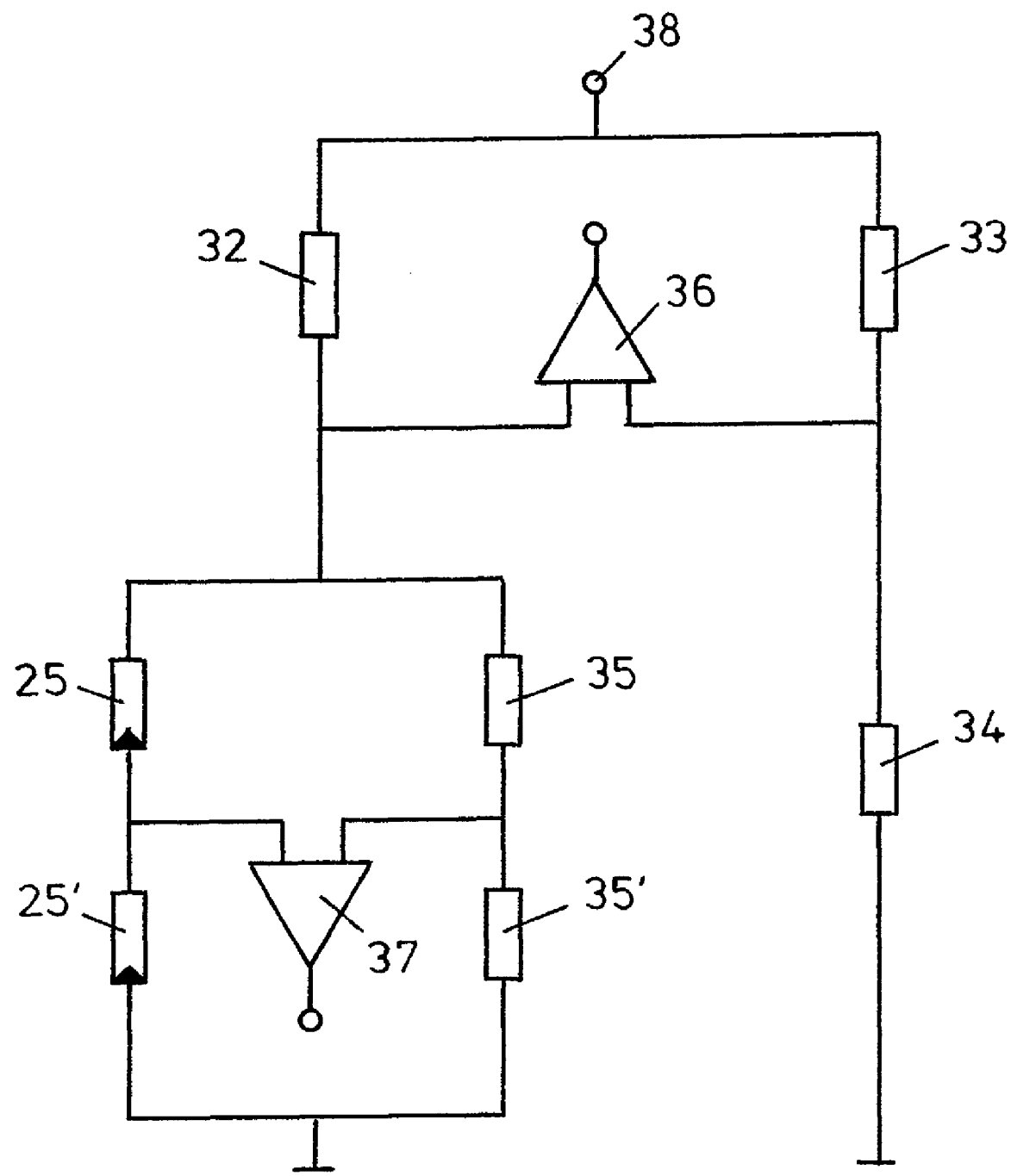
FIG. 6 is a possible circuit for analog measurement of the displacement and diameter of the gas bubble.

In order to evaluate the signals from the bubble level of FIG. 1, it has been described to digitize the signals from each of the light-sensitive elements 25 ... 25''' in an analog/digital converter 27. However, circuits are also possible which make available the difference signal and the cumulative signal by analog electrical circuitry. A circuit of this type is shown by way of example in FIG. 6—for the sake of clarity, only for one direction. The two light-sensitive elements 25 and 25' (shown as photodiodes) are connected, together with the two equal-value resistors 35 and 35', to a first Wheatstone bridge. The difference signal can then be tapped off at the output of the bridge amplifier 37. The whole of the first bridge includes, together with the three further bridge resistors 32, 33 and 34, a second Wheatstone bridge from the diagonals of which the cumulative signal can be tapped off via the amplifier 36. The supply voltage for the Wheatstone bridges is applied to the terminal 38. If the signals from the light-sensitive elements 25 and 25' change in opposite directions, the balance of the second Wheatstone bridge is not altered, so that it is not influenced by the difference signal of the light-sensitive elements 25 and 25'. In a corresponding manner, a change in the same direction in the signals from the light-sensitive elements 25 and 25' has no influence on the output signal of the amplifier 37. The outputs of the amplifiers 36 and 37 thus only provide the cumulative signal or the difference signal, respectively.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. An electronic scale comprising:
   a measuring sensor,
   a digital signal processing unit,
   a digital display, and
   a bubble level comprising a container that is partially filled with a liquid, forming a gas bubble having a position that corresponds to a tilt of the scale and a diameter that corresponds to an acceleration acting on the scale,
   wherein the digital signal processing unit comprises at least one of a circuit component and a program routine configured to detect a displacement of the gas bubble, and
   wherein the digital signal processing unit further comprises at least one of a circuit component and a program routine configured to detect a change in the diameter of the gas bubble.

2. The electronic scale as claimed in claim 1, further comprising an optical detector outputting values indicative of the displacement of the gas bubble and the diameter of the gas bubble.

3. The electronic scale as claimed in claim 2, wherein the optical detector comprises a light emitting diode arranged on a central axis as a light source and at least three light-sensitive elements, wherein the light-sensitive elements are arranged as circular segments around the central axis of the light emitting diode.

4. The electronic scale as claimed in claim 3, wherein the digital signal processing unit determines the displacement of the gas bubble from a difference signal of two mutually opposed elements of the at least three light-sensitive elements and determines the change in the diameter of the gas bubble from a cumulative signal from at least two elements of the at least three light-sensitive elements.

5. The electronic scale as claimed in claim 1, further comprising an electrical detector outputting values indicative of the displacement of the gas bubble and the change in the diameter of the gas bubble.

6. The electronic scale as claimed in claim 5, wherein electrical detector comprises a central electrode and a ring-form electrode subdivided into at least three electrode segments.

7. The electronic scale as claimed in claim 6, wherein the digital signal processing unit determines the displacement of the gas bubble from a difference signal of two respective, mutually opposed electrode segments and determines the change in the diameter of the gas bubble from a cumulative signal from at least two segments of the at least three electrode segments.

8. The electronic scale as claimed in claim 4, further comprising an analog/digital converter interposed between the light-sensitive elements and the digital signal processing unit.

9. The electronic scale as claimed in claim 7, further comprising an analog/digital converter interposed between the electrode segments and the digital signal processing unit.

10. A method for operating an electronic scale comprising a bubble level including a container that is partially filled with a liquid, forming a gas bubble having a diameter, comprising:
    detecting the diameter of the gas bubble to generate a diameter signal that corresponds to changes in the detected diameter; and
    correcting an influence of vibrations on the scale in accordance with the diameter signal.

11. The method as claimed in claim 10, wherein the scale further comprises a measuring sensor and a digital signal processing unit, and further comprising digitally correcting a signal from the measuring sensor in the digital signal processing unit in accordance with the diameter signal.

12. The method as claimed in claim 10, wherein the scale further comprises feet configured to adjust in height and respective height-adjusting actuators, and further comprising controlling the actuators in accordance with the diameter signal.

13. The method as claimed in claim 11, further comprising adjusting a time constant of at least one filter provided in the digital signal processing unit in accordance with an amplitude of variations in the diameter signal.

14. The method as claimed in claim 11, wherein the scale further comprises an analog/digital converter connected downstream of the measuring sensor, and further comprising adjusting a sampling frequency of the analog/digital converter in accordance with a frequency of variations in the diameter signal.

* * * * *